United States Patent [19]

Raisio

[11] Patent Number: 5,163,800
[45] Date of Patent: Nov. 17, 1992

[54] TRANSPORTABLE FRAME AND EQUIPMENT FRAME FOR USE WITH LOAD HANDLING SYSTEM

[75] Inventor: Reijo Raisio, Turku, Finland

[73] Assignee: Multilift Oy, Raisio, Finland

[21] Appl. No.: 713,009

[22] Filed: Jun. 10, 1991

Related U.S. Application Data

[63] Continuation of Ser. No. 358,620, May 30, 1989, abandoned.

[30] Foreign Application Priority Data

May 30, 1988 [FI] Finland ................................ 882542

[51] Int. Cl.⁵ .............................................. B60P 1/64
[52] U.S. Cl. .................................... 414/500; 414/498; 414/546
[58] Field of Search ............... 414/486, 491, 494, 498, 414/500, 546, 555, 559, 608

[56] References Cited

U.S. PATENT DOCUMENTS

| | | | |
|---|---|---|---|
| 3,472,407 | 10/1969 | Corompt | 414/494 X |
| 3,688,933 | 9/1972 | Rumell | 414/608 |
| 3,957,166 | 5/1976 | Durham | 414/491 X |
| 3,984,013 | 10/1976 | Wirz | 414/498 X |
| 3,987,918 | 10/1976 | Corompt | 414/500 X |
| 4,290,726 | 9/1981 | Sutela et al. | |
| 4,298,304 | 11/1981 | Jones | 414/494 X |
| 4,341,500 | 7/1982 | Laitinen | 414/498 |
| 4,344,731 | 8/1982 | Visa et al. | 414/471 |
| 4,453,878 | 6/1984 | Paukku et al. | |
| 4,589,671 | 5/1986 | Boughton | 414/546 X |
| 4,755,098 | 7/1988 | Wulf et al. | |
| 4,848,619 | 7/1989 | Corompt | 414/498 X |
| 4,854,087 | 8/1989 | Bishop | 414/498 |
| 4,934,898 | 6/1990 | Calbreath | 414/494 X |

FOREIGN PATENT DOCUMENTS

| | | | |
|---|---|---|---|
| 0107892 | 5/1984 | European Pat. Off. | |
| 0152159 | 8/1985 | European Pat. Off. | |
| 2432786 | 1/1976 | Fed. Rep. of Germany | 414/494 |
| 3136956 | 4/1982 | Fed. Rep. of Germany | |
| 58-97534 | 6/1983 | Japan | 414/546 |
| 591971 | 6/1975 | Switzerland | 414/498 |
| 2033346 | 5/1980 | United Kingdom | |
| 2092993 | 8/1982 | United Kingdom | |
| 2135658 | 9/1984 | United Kingdom | 414/498 |

OTHER PUBLICATIONS

"Military Ampliroll", Bennes Marrel Document #3-11385-06-88.

Primary Examiner—Robert J. Spar
Assistant Examiner—Robert S. Katz
Attorney, Agent, or Firm—Burns, Doane, Swecker & Mathis

[57] ABSTRACT

The present invention discloses a transportable frame, an equipment frame and a load carrying vehicle for using the transportable frame and the equipment frame. The load carrying vehicle has a movable hook arm which can pivot around a pivotal connection to a link member which is itself pivotally connected to the vehicle. The transportable frame has longitudinal beams and an upstanding end portion formed by upstanding beams and a cross piece. The upstanding end portion has a coupling arrangement for detachably securing the equipment frame thereto. The equipment frame supports an item of equipment and includes at least two connected beams and a coupling arrangement carried by the beams. An upper region of the equipment frame has a support having secured thereto the item of equipment. The hook arm of the load carrying vehicle is engageable with a hook bar of the equipment frame and the vehicle and the frames are arranged so that in the vehicle-loaded condition, the equipment frame is located to the rear of the transportable frame and the engagement of a hook with the hook bar of the equipment frame prevents rearward movement of the transportable frame whether or not the coupling member between the equipment and transportable frames are secured.

24 Claims, 8 Drawing Sheets

TRANSPORTABLE FRAME AND EQUIPMENT FRAME FOR USE WITH LOAD HANDLING SYSTEM

This application is a continuation of application Ser. No. 07/358,620, filed May 30, 1989, now abandoned.

BACKGROUND OF THE INVENTION

This invention relates to a transportable frame and an equipment frame for use with a load handling system. Load handling systems for loading a vehicle by pulling the load onto the vehicle over the rear of the vehicle are known, see for example British Patents Nos. 2033346 and 2092993. A system designed for military use is shown in European Patent No. 107892. A disadvantage of known systems is that they lack flexibility and versatility. These devices are suitable for the handling of such exchange platforms and cargo spaces below whose bottoms there are two carrying beams, whereat the parts of the loading device, in the transportation position, can be fitted between the beams of the platform placed on the vehicle, underneath the bottom of the platform. If the load to be handled has a substantially plane bottom, these devices cannot be used as such. The use of the device also requires a grasping loop placed at a certain level on the load platform. Problems are also caused when the vehicle cannot be driven to direct proximity of the load to be raised, and in particular when a floating load must be lifted out of water onto the vehicle.

The present invention aims to provide an improvement in this respect.

According to a first aspect of the invention, there is provided a transportable frame for carrying a load, the frame having longitudinal beams and an upstanding end portion formed by upstanding beams and a cross piece, in which the upstanding end portion has coupling means whereby an equipment frame can be detachably secured thereto.

Preferably the upstanding end portion has upper and lower coupling means attached thereto.

The upper coupling means may take the form of a pair of recesses for receiving laterally projecting members mounted on the equipment frame.

According to a second aspect of the invention, there is provided an equipment frame which includes connected beams and coupling means carried by the beams, an upper region of the frame having a support (e.g. a platform) capable of having secured thereto an item of equipment.

Preferably the connected beams carry upper and lower coupling means designed for co-operation with the coupling means on the transportable frame.

The upper coupling means may take the form of a pair of members which laterally project from respective beams of the equipment frame.

To the best of Applicant's knowledge and belief, the invention is unique in that the load handling system can load or unload items onto or off the transportable frame while the latter is carried on the vehicle. This has never been possible before, with any prior known load handling system of the kind described herein. This unique advantage is achievable because of the ability to attach and detach the equipment frame from the transportable frame when the latter is in loaded position on the vehicle. This enables the system to carry out tasks, for example fire rescue or street lamp replacement or repair, which could not be done by prior art systems without unloading the vehicle.

The equipment frame may include a pair of inclined beams and a hook bar extending between the beams. The support may connect the pair of beams at their upper ends and the hook bar preferably connects intermediate regions of the beams. The equipment frame may carry a winch mounted on the support. The winch may be powered by hydraulic fluid supplied under pressure from the vehicle. It (the support) may also carry a cable guide fitting. Alternatively, the equipment frame may carry any other hydraulically powered equipment, e.g. a mixer such as a cement mixer, spraying equipment, fire-fighting equipment or sand-blasting equipment. In this way, a variety of desired functions can be carried out as well as the loading or unloading of the transportable equipment frames onto or off the vehicle. Moreover, the additional function can be carried out without unloading the transportable frame from the vehicle and whether or not the transportable frame is itself carrying a load.

According to a third aspect of the invention, there is provided a load carrying frame assembly which consists of a transportable frame as defined above in combination with an equipment frame as defined above. Such an assembly can be loaded onto and unloaded off a vehicle over the rear of the vehicle using known hook arm systems, e.g. of the types disclosed in British Patent Nos. 2033346 and 2092993 and European Patent No. 107892.

According to a fourth aspect of the invention, there is provided a load carrying vehicle having a movable hook arm which can pivot around a pivotal connection to a link member itself pivotally connected to the vehicle, in combination with a transportable frame and an equipment frame as described herein, the hook arm being engageable with the hook bar of the equipment frame and the vehicle and the frames being constructed and arranged so that in the vehicle-loaded condition the equipment frame is located to the rear of the transportable frame and the engagement of the hook with the hook bar prevents rearward movement of the transportable frame whether or not the coupling means between the equipment and transportable frames are secured.

According to a fifth aspect of the invention, there is provided a system for loading a load onto a transportation vehicle and for removing it from the vehicle, which said vehicle is provided with a loading and unloading mechanism that includes a hook arm, an end of the hook arm being provided with a hook or a grasping member and the arm being pivotable around a transverse shaft located remote from the hook, in which the system also includes a transportable frame which can be loaded onto and off the vehicle by the mechanism, there being an equipment frame which can be detachably connected to either the mechanism or the transportable frame and which carries a winch or the like associated with a cable guided by a cable guide on the equipment frame, the cable being usable in the launching of a bridge or pontoon initially carried on the transportable frame.

The hook arm may be an L-shaped member or may be constituted by two members pivotally connected together.

The cable guide member placed above the hook of the angle piece also permits handling of such load units whose grasping loop is placed at a relatively high level in the transportation position.

The system can also be used, e.g., for lifting a wrecked car onto the transportation vehicle even from further outside the road.

Brief Description of the Drawing Figures

The invention will be better understood from the following non-limiting description of an example thereof given with reference to the accompanying drawings in which.

In the drawings, like parts are represented by like reference numerals.

DETAILED DESCRIPTION OF THE PREFERRED EMBODIMENT

Figure 1:
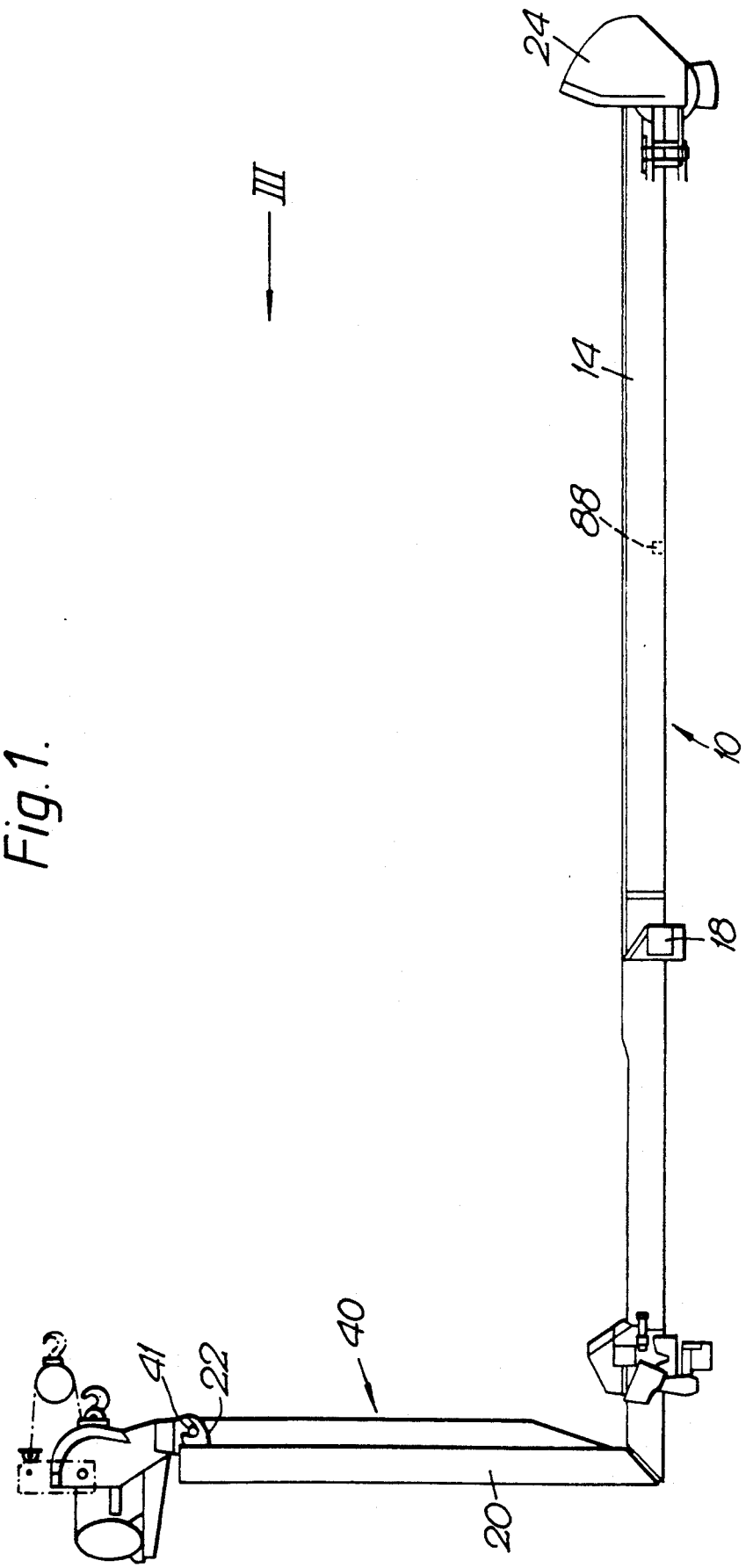
FIG. 1 is a side elevation illustrating an equipment frame according to the invention mounted on a transportable frame.
Figure 2:
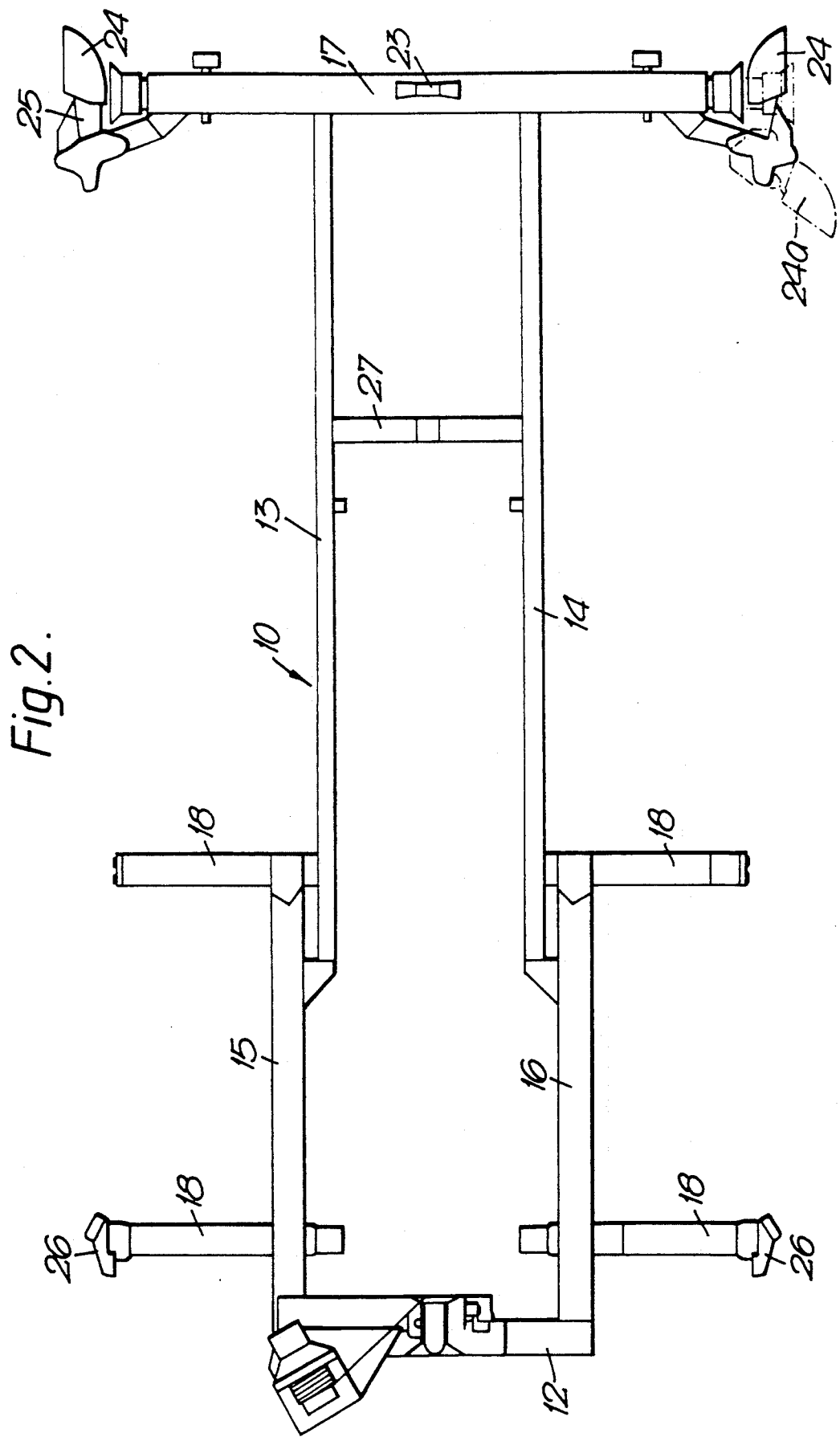
FIG. 2 is a plan view corresponding to FIG. 1.

Referring to FIGS. 1-3 and 7, the transportable frame 10 is in effect a so-called flatrack with an upstanding end portion 12 and with additional lateral beams for supporting a wide object to be carried on the transportable frame. The equipment frame 40 will be described later as will its manner of connection to the transportable frame 10.

The transportable frame 10 includes a pair of longitudinally extending beams 13, 14 which are connected to further longitudinal beams 15 and 16. There is a cross beam 17 at one end of the transportable frame, namely the end opposite to the upstanding portion 12. Laterally extending beams 18 are connected to the longitudinal beams. These enable the frame 10 to carry a wide load, for example a folded float bridge which may be launched into a river.

The upstanding end portion of the transportable frame 10 is formed by two inclined upstanding beams 19 and 20 joined by a cross beam 21. Mounted at laterally spaced locations on the cross beam 21 are a pair of lugs, one of which is shown at 22 in FIG. 1, each lug having recesses to receive a laterally extending member 41 of the equipment frame 40. The pair of lugs of which one is shown at 22 and the laterally extending members of which one is shown at 41 constitute a coupling means whereby the equipment frame 40 may be detachably connected to the transportable frame 10. A roller 23 is mounted on the cross beam 17 to facilitate the loading of items onto the transportable frame 10 (or the unloading of items from it) in a longitudinal direction over the beam 17. Power to pull an item onto the frame 10 over the beam 17 can be obtained using a winch and cable as will later be described in connection with the equipment frame 40. The cross beam 17 also has repositionable guides 24. The guides 24 are mounted on support arms 25 for pivotal movement about a substantially vertical axis between respective first positions shown in full lines where they guide a load onto the transportable frame 10 in a longitudinal direction and a second position 24a noted in dotted lines in FIG. 2 wherein they are moved clear to allow a wide load to be loaded onto the transportable frame.

The beams 18 are provided with the side guides 26.

Figure 3:
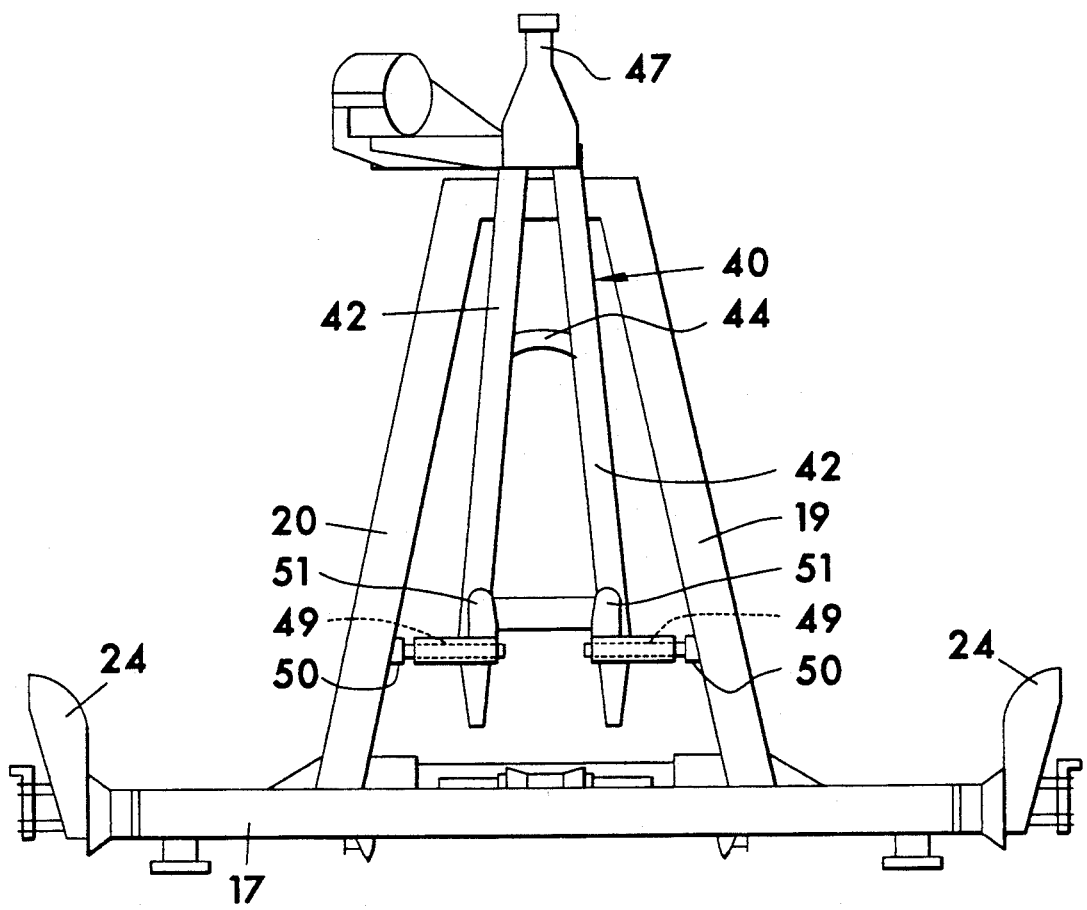
FIG. 3 is an end elevation, looking in the direction III in FIG. 1.
Figure 7:
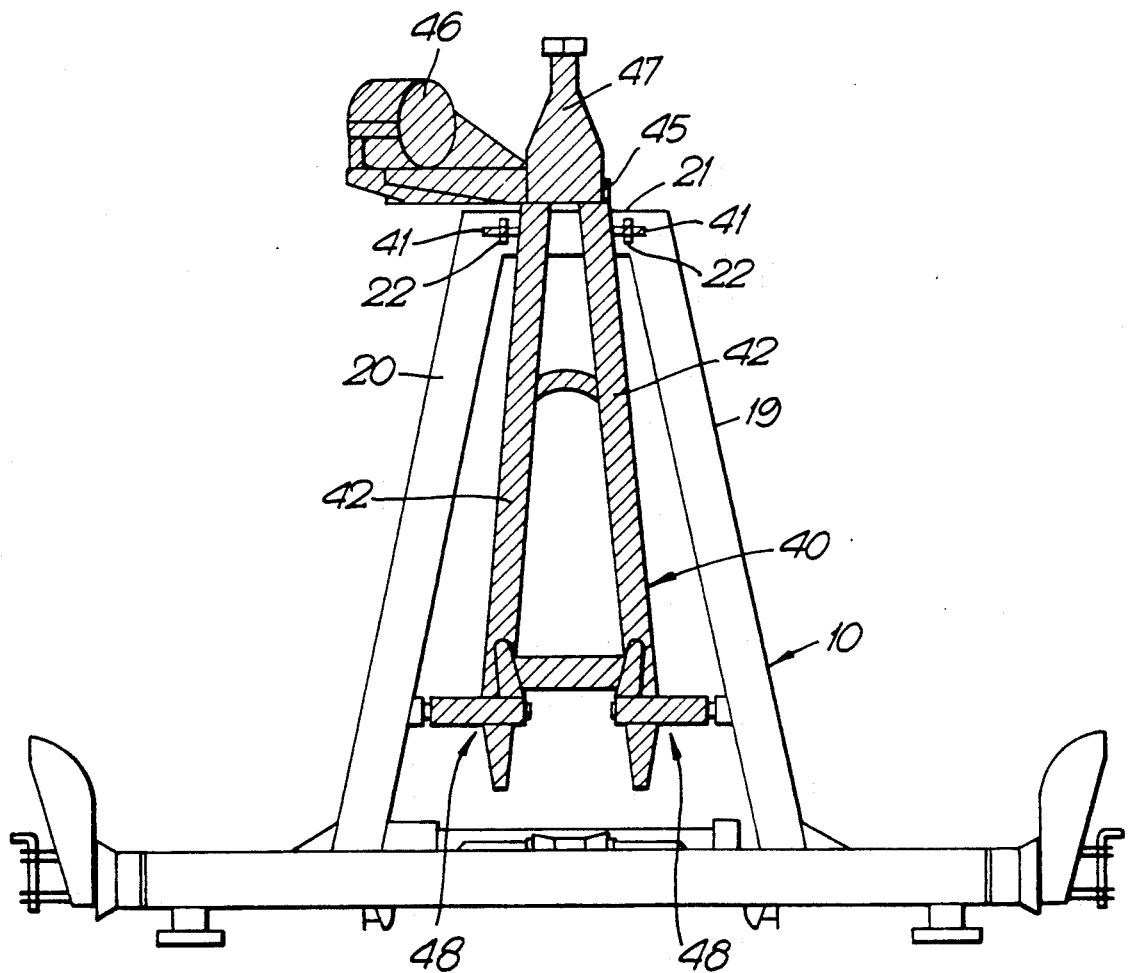
FIG. 7 is a diagrammatic illustration similar to FIG. 3 in which the equipment frame is shown shaded whereas the transportable frame is unshaded.

The equipment frame 40, as best seen in FIGS. 1, 3 and 7, includes a pair of inclined beams 42, which are joined by a cross beam 43 towards their lower ends, by a hook bar 44 part way up their height, and by a cross piece 45 which also serves as a support for an item of equipment for example a winch 46. Also mounted on the cross support 45 is a cable guide structure 47.

As best seen in FIGS. 1 and 7 (but not shown in FIG. 3) laterally extending members 41 project outwardly from an upper part of each of the inclined beams 42. These laterally projecting members can rest, as already described, within recesses in the lugs 22 on the upstanding portion of the transportable frame 10.

At or towards its lower end each of the beams 42 carries a coupling means generally indicated at 48. The illustrated coupling means includes a laterally slidable bolt which is movable into and out of engagement with a respective bolt recess 50 mounted on a respective one of the inclined beams 20 of the transportable frame. The bolts 49 are caused to reciprocate laterally by movement of lever arm handles 51. In this way, a secure coupling of the lower part of the equipment frame to the transportable frame can readily be made.

In an alternative coupling means, not illustrated, a rotatable shaft mounted in a journal on each beam extends laterally of the frame 40 and, at least at its other end, carries a C-shaped member designed to cooperate with a spigot attached to the adjacent beam 20. The shaft is rotated manually by a handle attached thereto to move the C-shaped member between a coupling or locked position wherein the spigot is within the 'C' recess and prevented from moving in a forward or rearward direction by the wall of the 'C' member and an uncoupled position wherein the gap in the 'C' member allows the spigot to be withdrawn from the recess.

In an advantageous version of this coupling arrangement, each rotatable shaft also carries a C-shaped member on its inner end, designed for cooperation with a confronting spigot extending outwardly from a side wall of the hook arm. With such an arrangement the equipment frame 40 may be securely attached to the hook arm by virtue of connections at two positions, namely the engagement between the hook and the hook bar at mid height level of the equipment frame 40 and the locked connection between the pair of laterally extending spigots on the hook arm and their cooperating C shaped members on the equipment frame 40.

Other forms of coupling for detachably connecting the transportable frame and the equipment frame could be employed, e.g. twist locks and corresponding apertured castings such as are conventionally used with I.S.O. containers.

Figure 4:
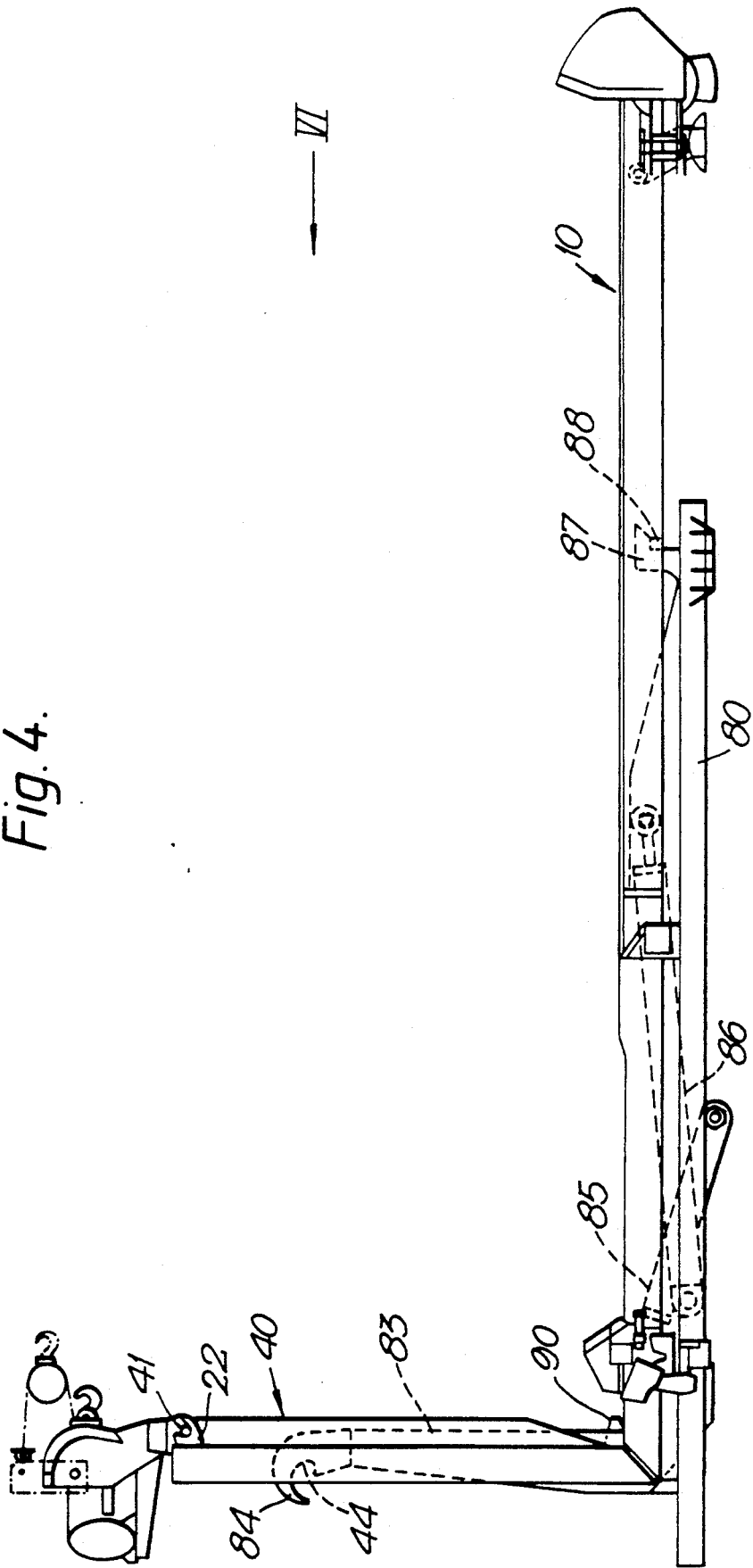
FIG. 4 is a side elevation similar to FIG. 1 but also showing a part of a load handling system.

As seen in FIG. 4, the transportable frame 10 and the equipment frame 40 are shown in association with a load handling system. The particular load handling system illustrated includes a base frame 80 formed by a pair of longitudinal beams connected by cross beams 81 and having pivoted thereto a pivotal link means 82 which is itself pivotally connected to a hook arm 83. The hook arm 83 has a hook 84 at its other end. Piston cylinder rams 85 are connected between the hook arm 83 and the link means 82 and enable pivoting of the hook arm relative to the link means 82. A pair of piston cylinder main drive rams 86 are connected between the pivotal link means 82 and the base frame 80. These permit pivoting of the link means 82 relative to the base frame 80 which in use is securely attached to the vehicle chassis. The base frame 80 includes a pair of upstanding hooks, one seen at 87 in FIG. 4, which are positioned to engage with a cross member 88 of the transportable frame 10.

The load handling system disclosed herein is essentially that shown in European Patent 107892 and operation of the system causes the hook 84 to describe a path formed by two arcs between a "vehicle loaded" position shown in FIG. 4 and a "vehicle unloaded" position not shown in which the hook arm extends rearwardly over the rear of the vehicle with the hook in a position ready to couple onto a hook bar of a container or transportable frame which is to be loaded. However, other designs of load handling system could equally well be employed and this invention is not limited to or by the detail of the illustrated load handling system.

Figure 5:
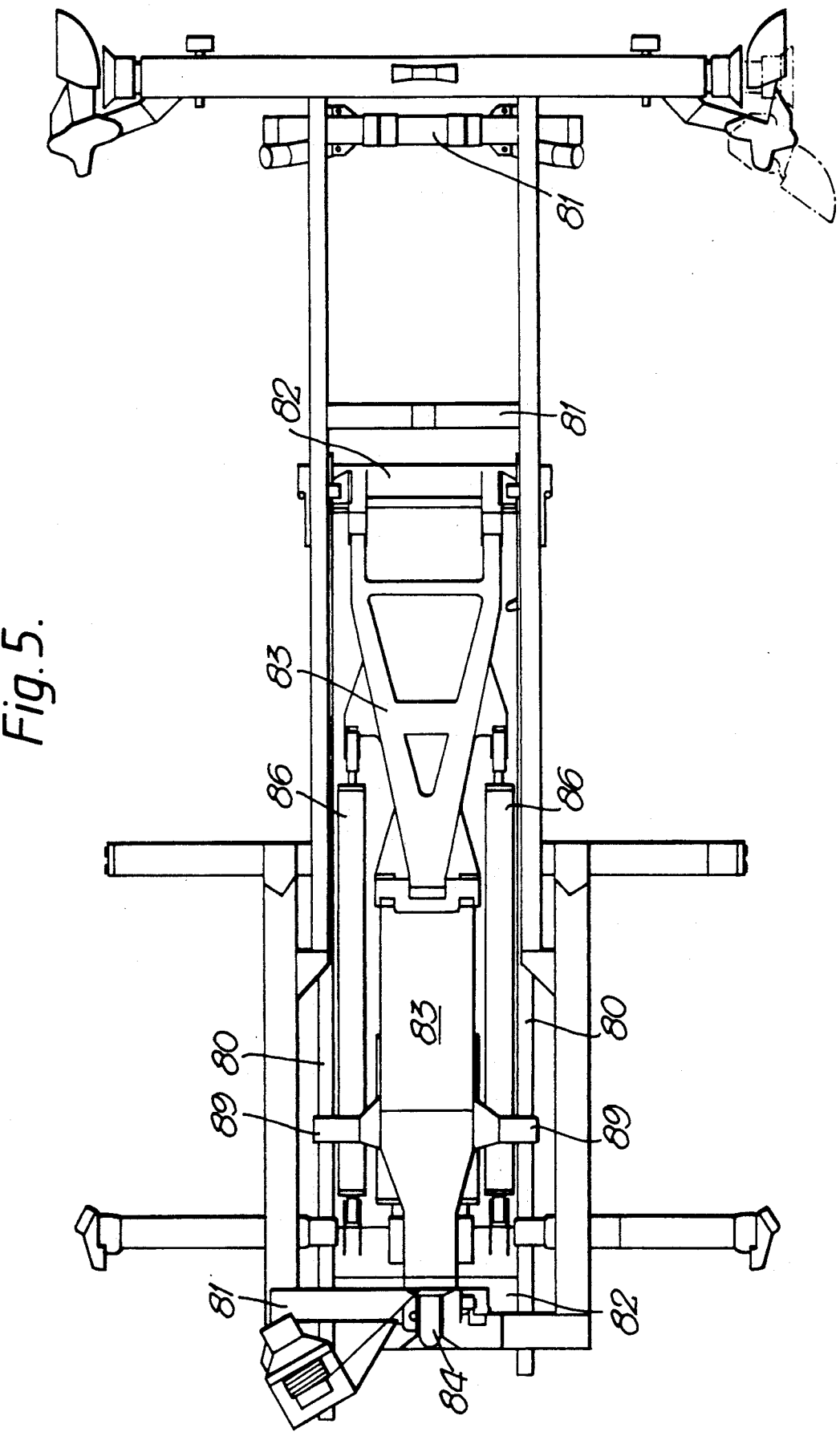
FIG. 5 is a plan view of the transportable frame, equipment frame, and load handling system shown in FIG. 4.
Figure 6:
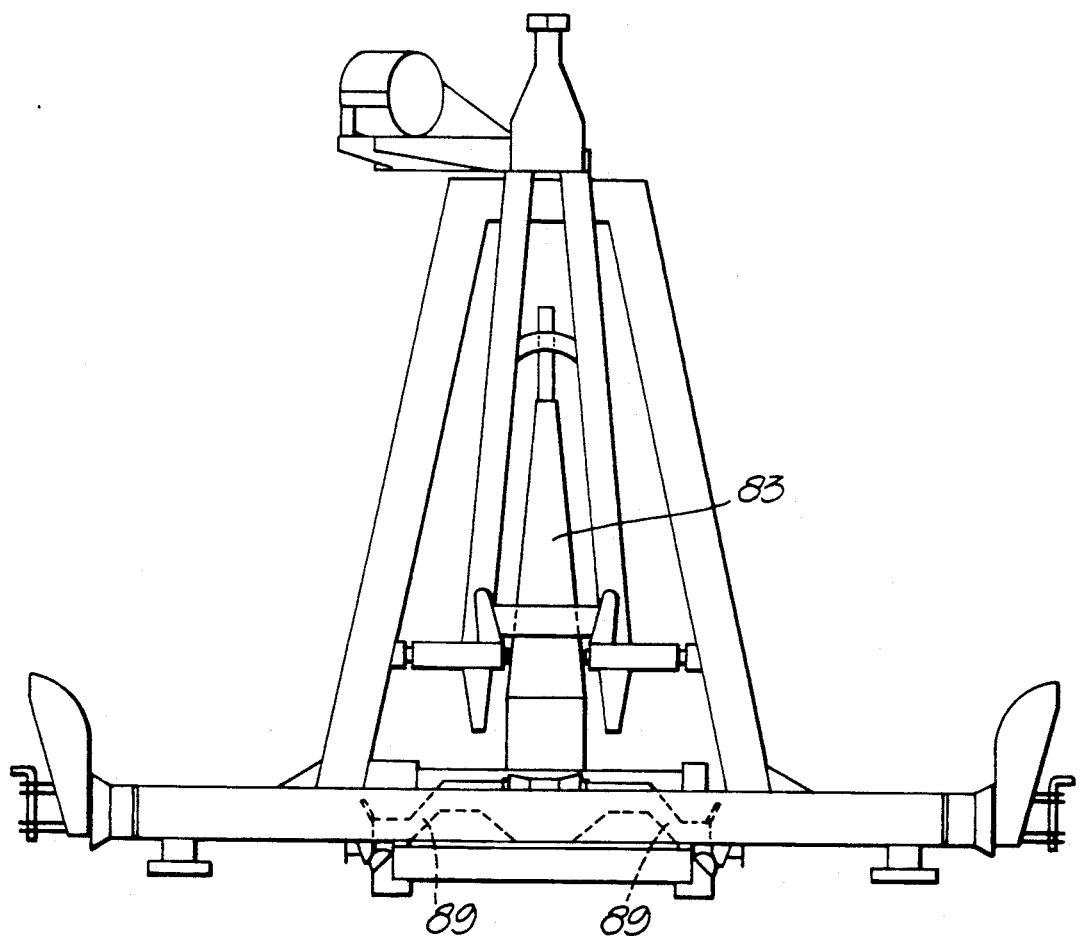
FIG. 6 is an end elevation on a larger scale looking in the direction VI in FIG. 4.

The hook arm 83 has laterally extending wing members 89 (FIGS. 4 and 5) which rest on the beams 80 of the load handling system base frame. As can be best seen from FIG. 4, in the vehicle loaded postion of the hook 84, the equipment frame 40 is in effect securely trapped in position. It cannot move rearwardly as shown in FIG. 4 because of the engagement of the hook bar 44 with the hook 84, and its lower end cannot move because the coupling means 48 (FIG. 7) interconnects the transportable frame 10 and the equipment frame 40. As illustrated in FIG. 3, the bolts 49 on the equipment frame engage with the recesses 50 on the transportable frame and the upper end of the equipment frame 40 is retained by the engagement of the lateral members 41 with the lugs 22 on the frame 10. A pair of resilient buffers 90 (FIG. 4) are mounted on the hook arm to face rearwardly. These are intended to absorb impacts when an article reaches its fully loaded position.

The part of the equipment frame 40 that is placed below the hook bar 44 between the upstanding beams 19 and 20 of the transportable frame is open so that the hook arm of the loading mechanism can pivot in this space during the loading movement.

The free space between the longitudinal beams 13, 14 of the transportable frame and the location of the cross beam 27 in the rear part of the loading base in front of the cross beam 17, permit movement of the hook arm 83 when the transportable frame is in its position on the vehicle. Even if the base of the load to be transported has a plane bottom, underneath the load a sufficient space is formed for the loading mechanism in the transportation position, because the height of the beams 13, 14 is sufficient.

A load such as a container or a float or a pontoon, if within the capacity of the winch, may be loaded onto the transportable frame 10 when the frame 10 is separated from the load handling system 80, e.g. when the load handling vehicle is on other duties. It may be loaded onto the frame 10 by hauling it on with a cable attached to the winch which is guided through the cable guide 47 in its path from the load item to the winch. The winch and its cable are particularly useful for maneuvering floating pontoons into the correct position.

The cable is also of assistance in maneuvering pontoons during recovery. The frame 10 and parts of the bridge loaded thereon may be lifted together onto the rear of a vehicle using the load handling system.

Figure 8:
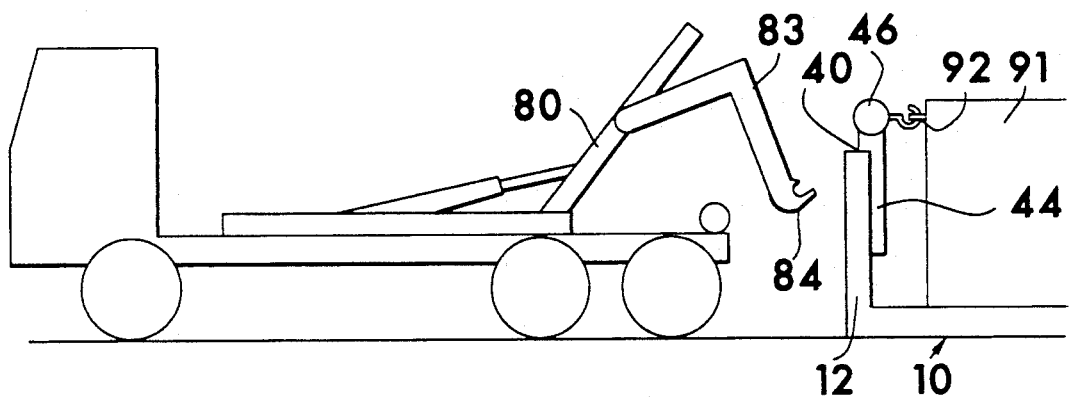
FIG. 8 is a schematic illustration showing a vehicle picking up a load on a transportable frame, with an equipment frame connected to the transportable frame.
Figure 9:
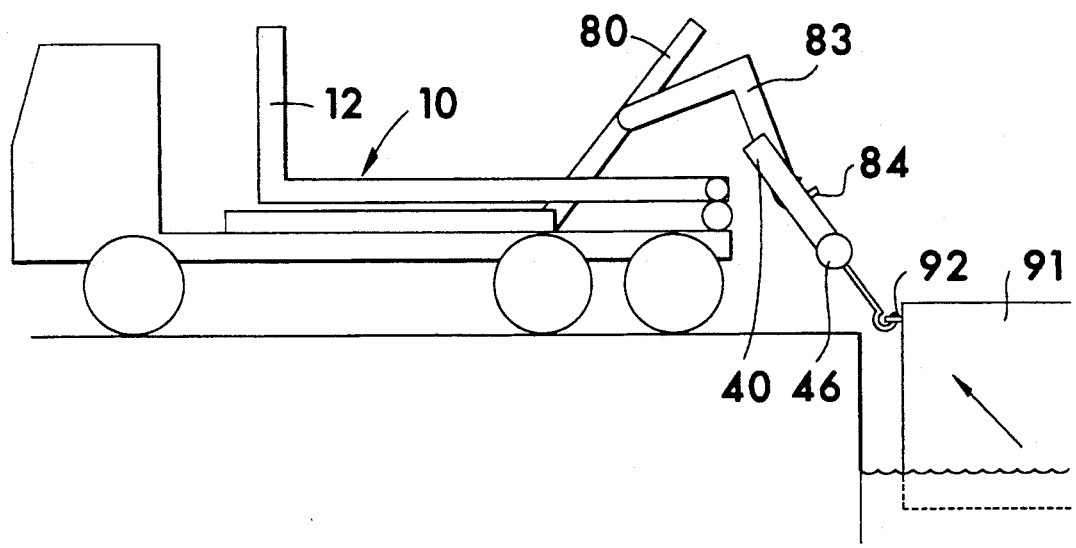
FIG. 9 is a schematic illustration showing a vehicle picking up a floating load with an equipment frame connected to the loading mechanism of the vehicle.

In FIG. 8, a vehicle provided with a hook mechanism in itself known has arrived at a depot area, where a load 91 to be loaded rests on a transportable frame 10 placed on the ground. The equipment frame 40 is fixed on the transportable frame. The fastening hook of the cable has been attached to the grasping loop 92 provided on the load, and the cable has been wound tight. The hook 84 of the loading mechanism of the vehicle is pivoted to the rear, and it engages the hook bar 44 provided on the equipment frame. The transportable frame 10 with the load 91 is pulled onto the vehicle in a way fully corresponding to an ordinary exchange platform.

When a floating load 91 is to be lifted out of water, the coupling means 48 of the equipment frame 40 are detached from the transportable frame 10 and attached to the load arm 83 of the loading mechanism. The hook arm 83 is pivoted between the beams of the transportable frame 10 rearwards to the lifting position. The winch cable is pulled out and the winch hook is attached to the grasping loop 92 provided on the load 91 that floats in water (FIG. 8). The cable is pulled in by means of the winch, and the hook arm 83 is turned in the ordinary way while pulling the load onto the transportable frame 10 placed on the vehicle.

It is also possible to place the winch drum, e.g., in the rear part of the vehicle, in which case its cable is passed by means of a guide duct or a pulley via the top end of the hook arm or of an extension of said hook arm. Thus, the cable guide member may consist of the winch itself or of a pulley or of a guide duct or guide loop. When the winch is placed on the vehicle, most appropriately cable guide ducts or pulleys are used additionally at least at all articulation points of the loading device, so that the position of the loading device does not affect the length of the free end of the cable. Moreover, if necessary, it is possible to use suitable guide plates for lateral guidance of the cable.

The vertical arms 19, 20 of the transportable frame 10 are not indispensable; the equipment frame 40 may also be mounted detachably at the forward end of the beams 15, 16.

The hook bar 44 may be placed, besides on the detachable equipment frame 40, also on the transportable frame 10 itself. In such a case, such an instant locking must be used in which, instead of the hook bar 44, some other member prevents pivoting of the equipment frame relative to the hook arm 83 when the equipment frame has been attached to the hook arm.

I claim:

1. A load handling system for loading a load on a vehicle, comprising:
    a loading mechanism mounted on the vehicle;
    a transportable frame including longitudinal beams placed at a distance from each other and connected to each other such that they define a free space therebetween, said transportable frame being loadable onto the vehicle in a transportable frame transportation position by the loading mechanism;
    an equipment frame selectively attachable to both said transport frame and said loading mechanism;
    coupling means for detachably securing said equipment frame to said transportable frame; and portions of the loading mechanism which project upwardly from a chassis of the vehicle below said transportable frame in a loading mechanism transportation position being accommodated within said free space between said beams, said free space being of sufficient size that parts of the loading mechanism move between said beams from the loading mechanism transportation position to a loading mechanism loading position above said transportable frame, said loading mechanism being selectively engagable with said equipment frame and movable between said beams from the loading mechanism transportation position to the loading mechanism loading position.

2. A load handling system according to claim 1, wherein said transportable frame further comprises an upstanding end portion, and wherein said coupling means includes upper and lower coupling means on said upstanding end portion.

3. A load handling system according to claim 2, wherein said upper coupling means includes a pair of recesses for receiving laterally projecting members.

4. A load handling system for loading a load on a vehicle, comprising:
a loading mechanism mounted on the vehicle;
a transportable frame for carrying a load, said transportable frame including longitudinal beams placed at a distance from each other and connected to each other such that they define a free space therebetween, said transportable frame being loadable onto the vehicle in a transportable frame transportation position by the loading mechanism and first coupling means for detachably securing an equipment frame to said transportable frame;
an equipment frame for supporting an item of equipment, said equipment frame including at least two connected beams, and second coupling means carried by said connected beams, an upper region of said equipment frame having a support capable of having secured thereto the item of equipment; and
portions of the loading mechanism which project upwardly from a chassis of the vehicle below said transportable frame in a loading mechanism transportation position being accommodated within said free space between said longitudinal beams of said transportable frame, and said free space being of sufficient size that parts of the loading mechanism move between said beams from the loading mechanism transportation position to a loading mechanism loading position above said transportation frame, said loading mechanism being selectively engagable with said equipment frame and movable between said longitudinal beams from the loading mechanism transportation position to the loading mechanism loading position.

5. A load handling system according to claim 4, wherein said second coupling means includes upper and lower coupling means designed for co-operation with said first coupling means on said transportable frame.

6. A load handling system according to claim 5, wherein said upper coupling means includes a pair of members which laterally project from said connected beams of said equipment frame.

7. A load handling system according to claim 4, wherein said connected beams of said equipment frame include a pair of inclined beams and a hook bar extending between said inclined beams.

8. A load handling system according to claim 7, wherein a support connects said inclined beams at their upper ends and said hook bar connects intermediate regions of said inclined beams.

9. A load handling system according to claim 8, further comprising a cable guide fitting mounted on said support.

10. A load handling system according to claim 9, wherein said cable guide fitting is a winch.

11. A load handling system according to claim 5, wherein said connected beams of said equipment frame include a pair of inclined beams and a hook bar extending between said inclined beams.

12. A load handling system according to claim 6, wherein said connected beams of said equipment frame include inclined beams, said load handling system further comprising a cable guide fitting mounted on a support which connects said inclined beams.

13. A load handling system according to claim 7, further comprising a cable guide fitting mounted on a support which connects said inclined beams.

14. A load handling system according to claim 9, wherein said cable guide fitting is a winch.

15. A load handling system for loading and unloading a load over the rear of and onto a vehicle, comprising:
a loading mechanism including a hook arm with a hook at a free end of said hook arm, another end of said hook arm being pivotally mounted to the vehicle for arcuate pivotal movement in a vertical plane between a loading mechanism loading position and a loading mechanism transportation position;
a transportation frame including two or more longitudinal beams, said two or more longitudinal beams placed relative to one another such that they define a free space therebetween, said free space extending rearwardly from a first end of said transportable frame, and an upstanding transverse end portion disposed at said first end of said transportable frame;
an equipment frame selectively attachable to both said transport frame and said loading mechanism
coupling means for detachably securing said equipment frame to said transportable frame, the coupling means being mounted on said upstanding transverse end portion of said transportable frame; and
portions of the loading mechanism which project upwardly from a chassis of the vehicle in the loading mechanism transportation position being accommodated within said free space between said beams, and said free space is of sufficient size that parts of the loading mechanism move between said beams to the loading mechanism loading position during said arcuate pivotal movement between the loading mechanism transportation position and the loading mechanism loading position.

16. A load handling system according to claim 15, wherein said coupling means includes upper and lower coupling means on said upstanding end portion.

17. A load handling system according to claim 15, wherein said coupling means includes upper and lower coupling means on said upstanding end portion.

18. A load handling system according to claim 17, wherein said upper coupling means includes a pair of recesses for receiving laterally projecting members.

19. A load handling system for loading a load on a vehicle over the rear of the vehicle, comprising:

a loading mechanism mounted on the vehicle including a hook arm with a hook at a free end of said hook arm, another end of said hook arm being pivotally mounted to the vehicle for arcuate pivotal movement in a vertical plane between a loading mechanism loading position and a loading mechanism transportation position, said hook being selectively engageable with an equipment frame;

a transportable frame for carrying a load, said transportable frame including longitudinal beams and an upstanding transverse end portion located at a first end of the transportable frame, the beams being connected to one another by said upstanding transverse end portion such that they define a free space therebetween, said free space extending rearwardly from said first end of said transportable frame;

first coupling means for detachably securing an equipment frame to said transportable frame; and an equipment frame for supporting an item of equipment, said equipment frame including at least two connected beams and a hook bar extending therebetween, and second coupling means carried by said connected beams, an upper region of said equipment frame having a support capable of having secured thereto the item of equipment;

portions of the loading mechanism project upwardly from a chassis of the vehicle below said transportable frame in a loading mechanism transportation position and are accommodated within said free space between said longitudinal beams of said transportable frame, said free space being of sufficient size that parts of the loading mechanism move between said beams from the loading mechanism transportation position to a loading mechanism loading position above said transportable frame, said loading mechanism being selectively engagable with said hook bar of said equipment frame and movable between said beams from the loading mechanism transportation position to the loading mechanism loading position.

20. A load handling system according to claim 19, wherein said second coupling means includes upper and lower coupling means designed for co-operation with said first coupling means on said transportable frame.

21. A load handling system according to claim 20, wherein said upper coupling means includes a pair of members which laterally project from said connected beams of said equipment frame.

22. A load handling system according to claim 19, wherein a support connects said inclined beams at their upper ends and said hook bar connects intermediate regions of said inclined beams.

23. A load handling system according to claim 22, further comprising a cable guide fitting mounted on said support.

24. A load handling system according to claim 21, wherein said connected beams of said equipment frame include inclined beams, said load handling system further comprising a cable guide fitting mounted on a support which connects said inclined beams.

* * * * *